(No Model.)
E. E. KELLER.
CONDUIT FOR ELECTRIC RAILWAYS.
No. 458,630. Patented Sept. 1, 1891.
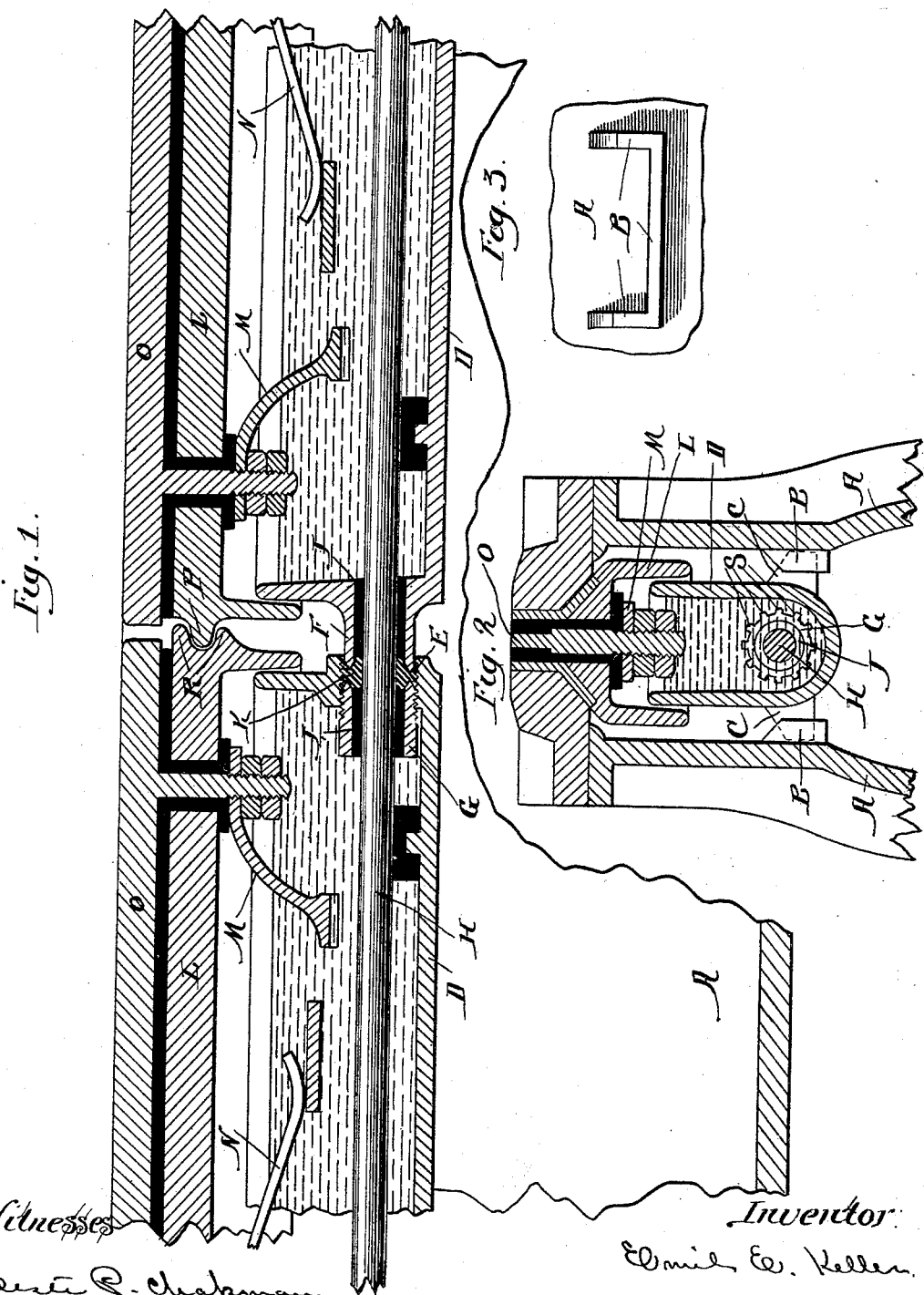

UNITED STATES PATENT OFFICE.

EMIL E. KELLER, OF CHICAGO, ILLINOIS.

CONDUIT FOR ELECTRIC RAILWAYS.

SPECIFICATION forming part of Letters Patent No. 458,630, dated September 1, 1891.

Application filed November 21, 1890. Serial No. 372,177. (No model.)

*To all whom it may concern:*

Be it known that I, EMIL E. KELLER, a citizen of the United States, residing at Chicago, in the county of Cook, State of Illinois, have invented a new and useful Improvement in Conduits for Electric Railways, of which the following is a full, clear, and exact specification.

My invention relates to conduits for electric railways, and has for its object to provide improvements upon the apparatus shown in the application of Frederick E. Degenhardt, of even date herewith. It is illustrated in the accompanying drawings, wherein—

Figure 1 is a longitudinal section. Fig. 2 is a cross-section. Fig. 3 is a detail side view showing the means for supporting the conductor-carrying box within the drainage-conduit.

Like parts are indicated by same letters in all the figures.

My invention is applied to conduits of the kind shown in the drawings, where is represented a conduit consisting of a series of boxes or troughs which contain fluid and a continuous conductor passing through such boxes and insulated within the same and preferably submerged beneath the surface of the fluid. These boxes are provided each with movable covers and contact-pieces, said contact-pieces adapted when the covers are depressed to engage the conductor and connect with an exposed upper conducting-plate, along which the current-wheel from the car will travel. Each of these movable covers is spring-supported, so as normally to be lifted to the level of the earth above and to keep the contactors away from the conductor in the boxes. The conductor passes through insulated and packed joints from time to time, the fluid in one box thus being prevented from passing over into the adjacent boxes. I have not fully described all of these features, as many of them shown here are not of my invention.

The general object of the device of course is to provide beneath the surface of the earth a concealed insulated continuous conductor and to associate therewith a series of spring or elastic plates carrying contactors below, which engage the conductor and metallic strips above, which receive the current-wheel from the car, and thus lead the current into the motor on the moving car above.

A is the exterior drainage-conduit, provided with U-shaped brackets B B, open above and adapted to receive the side lugs C C, which project from the conductor-carrying boxes D D. One end of each box is provided with a screw-threaded aperture E and the other end with the nipple F, adapted to pass into such screw-threaded aperture.

G is a screw-threaded thimble which is adapted to engage the screw-threaded aperture E and which is placed upon the conductor H.

J J are similar thimbles of insulation, in like manner placed upon the conductor H and adapted one to rest within the thimble G and the other within the nipple F. The opposed edges of the nipple F and the thimble G are V-shaped in cross-section, as indicated, and between them is placed a quantity of insulating packing material K, which is thus disposed within the screw-threaded aperture E about the conductor H and between the opposed ends of the nipple F and the thimble G. Each box is provided with a lid L, having the insulated contact-pieces M and the supporting-spring pieces N and the upper insulated conducting-strip O. It is important that the adjacent ends of the lids of the box should rise and fall together, and hence I provide upon one end of each lid a projecting lug or rib P and on the opposite end of the other lid the lugs or ribs R R, between which the lug P is received. It is of course only necessary for this operation to have engaging parts on the opposed ends, so that the lids shall rise and fall together, and to have such engaging parts free from the upper conducting-ribs O O. The thimble G is provided with an exterior construction to admit of the application of a wrench—as, for example, the series of lugs S S. It is evident that these parts may be much altered without departing from the spirit of my invention.

The use and operation of my invention are as follows: The exterior drainage-conduit being placed in position, the interior boxes or conductor-carrying conduits are dropped into position from above, each successive box D being supported by its arms C C in the U-shaped brackets B B, so as to be incapable of any motion within the drainage-conduit, or, at least, so as to have very little motion. In bringing the boxes into position, the nipple F is inserted a short distance into the screw-threaded aperture E, the thimbles G and J J having been first placed upon the conductor H. A quantity of insulating packing is now placed within the perforation E and against the end of the nipple, and the thimbles G and J are brought forward into the position shown. If, now, the thimble G be turned and screwed into the aperture E, it is clear that the packing will be forced very securely into position, so as to seal the interiors of the adjacent boxes from the exterior and also to seal the interior of each box from its adjacent box. In this operation the boxes are not moved longitudinally, since they are held in position by their engaging lugs and the U-shaped brackets. Means may be devised for holding the insulated thimbles J J, if found necessary. The lids are now dropped into position, their adjacent ends being first brought into engagement before they are lowered into position. Two thimbles, one being used instead of the nipple, could of course be used, but such thimbles would serve the same purpose as a nipple, but where the ends of the boxes are brought closely together, might be desirable.

I claim—

1. In a conduit for electric street-railways, the combination of successive insulated conducting-strips not in electrical connection with each other and capable of motion with suitable supports, said supports provided with engaging adjacent ends, so that adjacent ends of the conductor-strips will move together.

2. In a conduit for electric street-railways, the combination of a series of boxes or conduits through which the conductor passes, each provided with an aperture at one end and a nipple at the other, through both of which the conductor passes, and a thimble within the box and adapted to be received into the aperture, insulation about the conductor and within the thimble and nipple, and packing between the opposed ends of the thimble and nipple of adjacent boxes.

3. In a conduit for electric street-railways, the combination of a series of boxes or conduits through which the conductor passes, each provided with an aperture at one end and a nipple at the other, through both of which the conductor passes, and a thimble within the box and adapted to be received into the aperture, insulation about the conductor and within the thimble and nipple, and packing between the opposed ends of the thimble and nipple, said thimble screw-threaded into the aperture and adapted to be screwed so as to compress the packing between such opposed ends of the nipple and thimble and between the walls of the aperture and the surface of the conductor.

4. In a conduit for electric street-railways, the combination of a series of boxes or conduits through which the conductor passes, each provided with an aperture at one end and a nipple at the other, through both of which the conductor passes, a thimble within the box and adapted to be received into the aperture, insulation about the conductor and within the thimble and nipple, and packing between the opposed ends of the thimble and nipple, said thimble screw-threaded into the aperture and adapted to be screwed so as to compress the packing between such opposed ends of the nipple and thimble and between the walls of the aperture and the surface of the conductor, said boxes supported by arms which are received into fixed U-shaped brackets, so as to have little or no longitudinal motion.

EMIL E. KELLER.

Witnesses:
CELESTE P. CHAPMAN,
HARRIET M. DAY.